US011295124B2

(12) United States Patent
Saluja et al.

(10) Patent No.: US 11,295,124 B2
(45) Date of Patent: Apr. 5, 2022

(54) METHODS AND SYSTEMS FOR AUTOMATICALLY DETECTING THE SOURCE OF THE CONTENT OF A SCANNED DOCUMENT

(71) Applicant: Xerox Corporation, Norwalk, CT (US)

(72) Inventors: Veena Kumari Saluja, Hertfordshire (GB); Simon John Gray, Westoning (GB); David Snowball, Sandy (GB); Naveenraj Kaliarajan, Erode (IN)

(73) Assignee: Xerox Corporation, Norwalk, CT (US)

( * ) Notice: Subject to any disclaimer, the term of this patent is extended or adjusted under 35 U.S.C. 154(b) by 167 days.

(21) Appl. No.: 16/154,083

(22) Filed: Oct. 8, 2018

(65) Prior Publication Data

US 2020/0110931 A1 Apr. 9, 2020

(51) Int. Cl.
*G06K 9/00* (2006.01)
*G06F 16/951* (2019.01)
*G06F 16/955* (2019.01)

(52) U.S. Cl.
CPC ....... *G06K 9/00483* (2013.01); *G06F 16/951* (2019.01); *G06F 16/9566* (2019.01); *G06K 2209/01* (2013.01)

(58) Field of Classification Search
CPC ............ G06K 9/00483; G06K 2209/01; G06F 16/9566; G06F 16/951
USPC .................................................. 707/758, 706
See application file for complete search history.

(56) References Cited

U.S. PATENT DOCUMENTS

| | | | |
|---|---|---|---|
| 6,766,069 B1* | 7/2004 | Dance | G06F 40/169 382/309 |
| 9,654,666 B1 | 5/2017 | Snowball | |
| 9,817,619 B2 | 11/2017 | Snowball | |
| 9,819,824 B2 | 11/2017 | Berke et al. | |
| 10,049,097 B1 | 8/2018 | Gopalakrishnan et al. | |
| 10,051,152 B1 | 8/2018 | Snowball et al. | |
| 2003/0033288 A1* | 2/2003 | Shanahan | G06F 16/3322 |
| 2003/0069877 A1* | 4/2003 | Grefenstette | G06F 16/3323 |
| 2004/0052433 A1* | 3/2004 | Henry | G06F 16/3334 382/305 |
| 2007/0011140 A1* | 1/2007 | King | G06F 16/433 |
| 2007/0041668 A1* | 2/2007 | Todaka | G03G 15/502 382/306 |
| 2007/0214112 A1* | 9/2007 | Towers | G06F 16/332 |
| 2008/0243842 A1* | 10/2008 | Liang | G06F 16/93 |
| 2010/0257141 A1* | 10/2010 | Monet | G06F 16/93 707/665 |
| 2010/0278453 A1* | 11/2010 | King | G06F 40/169 382/321 |

(Continued)

*Primary Examiner* — Evan Aspinwall
(74) *Attorney, Agent, or Firm* — Ortiz & Lopez, PLLC; Kermit D. Lopez; Luis M. Ortiz

(57) ABSTRACT

Methods, systems and computer-readable storage media for scanning a document to detect a source of the document. The document can be scanned to obtain content from the document. An automatic search of an electronic network can be then performed to determine if there is an exact match or a partial match between the content of the document and the results of search automatic search. If an exact match or a partial match is generated as a result of automatically searching the electronic network, a user can be presented with various selection options via a GUI for retrieving, viewing and printing search results of the automatic search.

18 Claims, 7 Drawing Sheets

(56) References Cited

U.S. PATENT DOCUMENTS

| | | | |
|---|---|---|---|
| 2011/0043652 A1* | 2/2011 | King | G06F 40/194 |
| | | | 348/222.1 |
| 2011/0119262 A1* | 5/2011 | Dexter | G06F 16/951 |
| | | | 707/726 |
| 2012/0128250 A1* | 5/2012 | Petrou | G06K 9/036 |
| | | | 382/182 |
| 2013/0047066 A1* | 2/2013 | Lee | G06F 16/93 |
| | | | 715/229 |
| 2013/0070163 A1 | 3/2013 | Connors | |
| 2013/0335785 A1 | 12/2013 | Qi et al. | |
| 2015/0379139 A1* | 12/2015 | Rodriguez | G06F 16/951 |
| | | | 707/770 |
| 2017/0140219 A1* | 5/2017 | King | G06K 9/2063 |
| 2017/0355529 A1 | 11/2017 | Liu et al. | |
| 2018/0096203 A1* | 4/2018 | King | G06F 40/10 |
| 2018/0114085 A1 | 4/2018 | Gopalakrishnan et al. | |
| 2018/0167525 A1 | 6/2018 | Ogasawara | |
| 2018/0196877 A1 | 6/2018 | Mertens et al. | |
| 2018/0213119 A1 | 6/2018 | Sasaki | |
| 2018/0232204 A1 | 8/2018 | Ghatage et al. | |
| 2018/0234578 A1 | 8/2018 | Okawa et al. | |
| 2019/0034446 A1* | 1/2019 | Martinez | G06F 16/31 |

* cited by examiner

METHODS AND SYSTEMS FOR AUTOMATICALLY DETECTING THE SOURCE OF THE CONTENT OF A SCANNED DOCUMENT

TECHNICAL FIELD

Embodiments are generally related to the field of scanned documents and image processing. Embodiments further relate to OCR (Optical Character Recognition). Embodiments further relate to methods and systems for automatically identifying the source of a scanned document.

BACKGROUND

In some cases a user may have an entire document or even a portion of a document and may need to find out if the identical content contained in the document is available elsewhere, such as on the Internet. This may be necessary to determine if the document was plagiarized or is lacking in key citations. Conventionally, determining the source of a scanned document involves manually performing an Internet search (e.g., using a search engine such as Google, Bing, Yahoo, etc.) and then comparing the results (e.g., the URL) word by word to determine if the scanned document originated from an online source. This can be a slow and tedious process and even a slight mistake in manually entering the exact content into a search engine may skew the results.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide methods and systems for scanning a document and detecting the source or origin of the scanned document.

It is another aspect to provide for OCR (Optical Character Recognition) of a scanned document and the use of the OCR document content in an automatic Internet search.

It is another aspect of the disclosed embodiments to provide for methods and systems for comparing the content of a scanned document to the results of an automatic Internet search based on a query that includes the exact content of the scanned document.

The aforementioned aspects and other objectives and advantages can now be achieved as described herein. Methods, systems and computer-readable storage media are disclosed for scanning a document to detect a source of the document. The document can be scanned to obtain content from the document. An automatic search of an electronic network can be then performed to determine if there is an exact match or a partial match between the content of the document and the results of search automatic search. If an exact match or a partial match is generated as a result of automatically searching the electronic network, a user can be presented with various selection options via a GUI for retrieving, viewing and printing search results of the automatic search.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
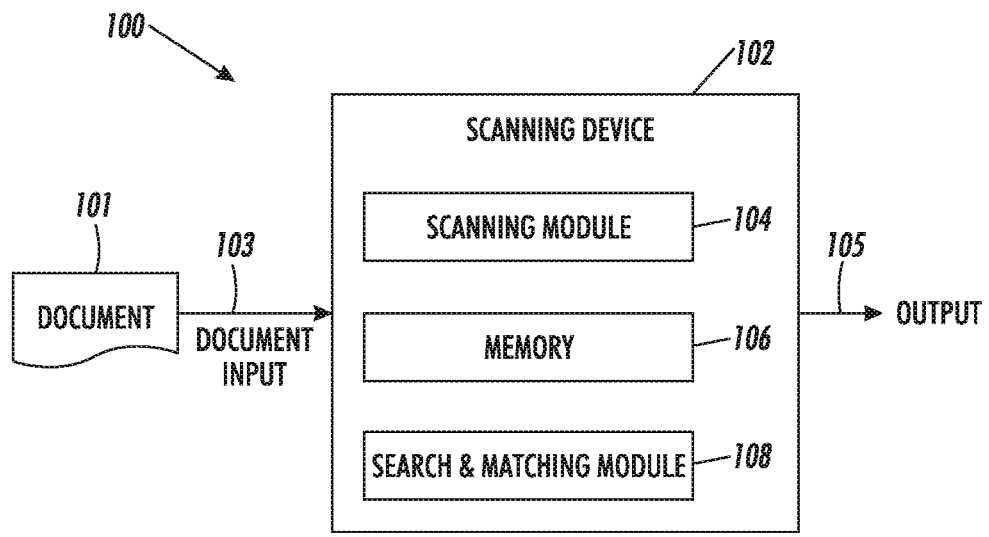
FIG. 1 illustrates an exemplary block diagram illustrating a system for scanning and identifying the source or origin of a document, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, engines, applications etc. (which can be individually or collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Definitions of one or more terms that will be used in this disclosure are described below without limitations. For a person skilled in the art, it is understood that the definitions are provided just for the sake of clarity, and are intended to include more examples than just provided below.

The term "document" as utilized herein can refer to an input document provided for scanning. The input document can be any document having text, graphics, mathematical formulas, charts, graphs, bar codes, QR codes, and so on. Examples of an input document can include, but are not limited to, a book, article, publication, a passport, an identification statement, an invoice, a bank statement, a computerized receipt, a business card, etc.

The term "scanned image" as utilized herein can refer to an image generated upon either scanning the document, or taking a picture of the document. The scanned image may also be referred to as a digital image.

The term "scanning device" as utilized can refer to an electronic device that receives and scans the document to generate a digital image of the document. The digital image may be of format such as pdf, jpeg, mpeg, etc. Examples of the scanning device include, but are not limited to an optical scanner, a facsimile, a digital camera, a mobile phone with camera, and a multi-function device. The scanning device may also be interchangeably used with the phrase "scanner" or "scanning module."

The term "multi-function device" as utilized herein can to a device or a combination of multiple devices configured to perform one or more functions, but not limited to, scanning, printing, copying, imaging, and so forth. The multi-function device includes software, hardware, firmware, or combination thereof. In the context of the current disclosure, a multi-function device can include, for example, a scanning device.

The term "computing device" as utilized herein generally refers to a device that includes a processor/microcontroller and/or any other digital components, for performing one or more operations according to one or more programming instructions. In other words, the computing device has image processing capability, e.g., generating a document in the context of the current disclosure. Also, such a computing device can communicate with a scanning device as and when required. A few examples of a computing device include but are not limited to a server, a desktop PC, a notebook, a workstation, a personal digital assistant (PDA), a mainframe computer, a mobile computing device (e.g., a mobile phone, a tablet, etc.), an internet appliance, and so on. In some instances the term "data-processing system" can be utilized interchangeably with the term "computing device".

"Optical character recognition (OCR)" as utilized herein refers to the conversion of text content (e.g., handwritten, typewritten, or printed) in an image, such as a scanned document or an image of a document, into machine-encoded text for generating an electronic document of the image. In an embodiment, the electronic document generated after performing the OCR on the image can be edited electronically.

An "electronic document" as utilized herein refers to information recorded in a manner that requires a computing device or any other electronic device to display, interpret, and process it. In an embodiment, the electronic document includes OCR text of an image. In an embodiment, the electronic document may comprise text content (i.e., OCR text), which can be edited electronically.

FIG. 1 illustrates an exemplary block diagram illustrating a system 100 for scanning and identifying the source or origin of a document 101, in accordance with an example embodiment. As depicted in the exemplary embodiment shown in FIG. 1, the system 100 includes a scanning device 102 (or a multi-function device), having a scanning module 104, a memory 106, and a searching and matching module 108. Each of the modules 104, 106, 108 can communicate with each other and are coupled via a conventional bus or a later developed protocol. An example of such a bus is the bus 110 shown in FIG. 7.

Note that in some cases, the search and matching module 108 may be implemented as a software module that is actually stored in the memory 106 and subject to processing by a processor (not shown in FIG. 1). In some example embodiments, the search and matching module 108 may be implemented as a combination of hardware and software.

Examples of the scanning device 102 include, but are not limited to an optical scanner, a facsimile, a digital camera, a mobile phone with camera, a multi-function device and others. The scanning device 102 may have other modules (although not shown) required for implementing the disclosed embodiments but such modules should not interfere in the implementation of the disclosed embodiments. A few examples include a feeder unit, a processor, or the like.

The input document 101 is typically provided as a hard copy of physical document to the scanning device 102. Note that once the scanning device 102 scans the document 101, the resulting digital document or digital image may be considered to be an electronic document, which can be further subject to image processing operations such as OCR operation.

The input document 101 can be received in some embodiments via a feeder unit for scanning and passes the input document 101 to the scanning module 104 as indicated by the arrow 103 in FIG. 1 labeled document input. Here, the input document 101 can be, for example, a page of written text and/or graphics, an article or portion of an article, a report, an invoice, a passport, an invoice, a bank statement, a computerized receipt, a business card, a mail, legal document, phone bill, forms and so on. These are just few examples but there can be many other types of documents for implementing the disclosed embodiments. The input document 103 is the actual hard copy. The input document 101 can include content such as graphics, text information, charts, graphics and so on.

The scanning module 104 receives the input document as provided by a user. Upon receiving, the scanning module 104 scans the input document to generate a digital or a scanned image of the input document. The scanned image as generated by the scanning module 104 represents a digital file of any format such as, but not limited to, pdf, jpg, txt, word, etc. The process of generating the scanned image from the hard copy is known in the art and thus, any additional details are not needed for the discussion of the current disclosure. The scanning module can be configured in some example embodiments to implement OCR operations and in fact may include an OCR engine that performs an OCR operation with respect to the scanned document. In an alternative example embodiment, the OCR engine may be a separate module contained in the scanning device 102 or in the memory 106 and which the scanning module 104 communicates with to facilitate OCR operations.

The scanning device 102 may include a Graphical User Interface (GUI, although not shown) for enabling a user to provide instructions/input for scanning the input document 101. For example, the instructions may be scan a document using OCR options. The GUI further displays the digital image of the input document upon completion of the scanning process or in between.

Sometimes a user may possess a whole or a part of a document and needs to know if the same content is available via the Internet. Conventionally, the only way to determine if such content is already available via the Internet is to manually search the Internet (i.e., via a search engine) and compare the URLs presented in the search word for word to determine if the content is derived from an online search.

The approach shown in FIG. 1 allows for scanning of a document (e.g., such as the input document 101) via the scanning module and OCR operation with respect to the content contained in the document. The search and matching module 108 provides for operations involving an automatic search of the Internet based on the content contained in the scanned document 101. If an exact (i.e., 100 percent) match is made with respect to the scanned content, then the user is presented with different options, which are discussed in greater detail. The user can also be presented with various options if a partial match is made. The results of the aforementioned automatic search can be provided as output as indicated by arrow 105, which can be displayed for a user via the GUI discussed previously and/or manipulated by the user via the GUI. The various options discussed above can also be presented to the user through such a GUI.

The scanning module 104 can be configured to receive the digital input of the input document 101, and also configured to convert the digital image into a binary form, and in some cases remove all lines from the digital image and perform an OCR of, for example, text and other images (e.g., graphics, charts, figures, bar codes, QR codes, etc) contained in the scanned document. The aforementioned OCR operation provided by the scanning module 104 can also involve rendering the digital image as a document that is an editable and searchable document of a pre-defined format such as for example, PDF. The search and matching module 108 performs its searching and matching operations with respect to the digital image and the contained therein.

Once the digital image is generated via the scanning module 104 and then the searching and matching operation performed via the search and matching module, the resulting data (e.g., search and matching results) can be provided as output data (see arrow 105) and displayed in a GUI for the user. In some situations, the results can be sent to the user via email. The user can provide his email details using the GUI of the scanning device 102. The user can also access the search and matching using any device such as a mobile device (e.g., smartphone), Personal Digital Assistant (PDA), tablet, laptop, computer, or any other device of the user.

Note that the memory 106 can store the input document 101, the digital image of the input document, and the searching and matching results (generated by the search and matching module 108) corresponding to the digital image of the input document 101. Such information can be stored in any desired format. Any other data associated with the input document at intermediate stages may also be stored in the memory 106 for further retrieval or otherwise.

Figure 2:
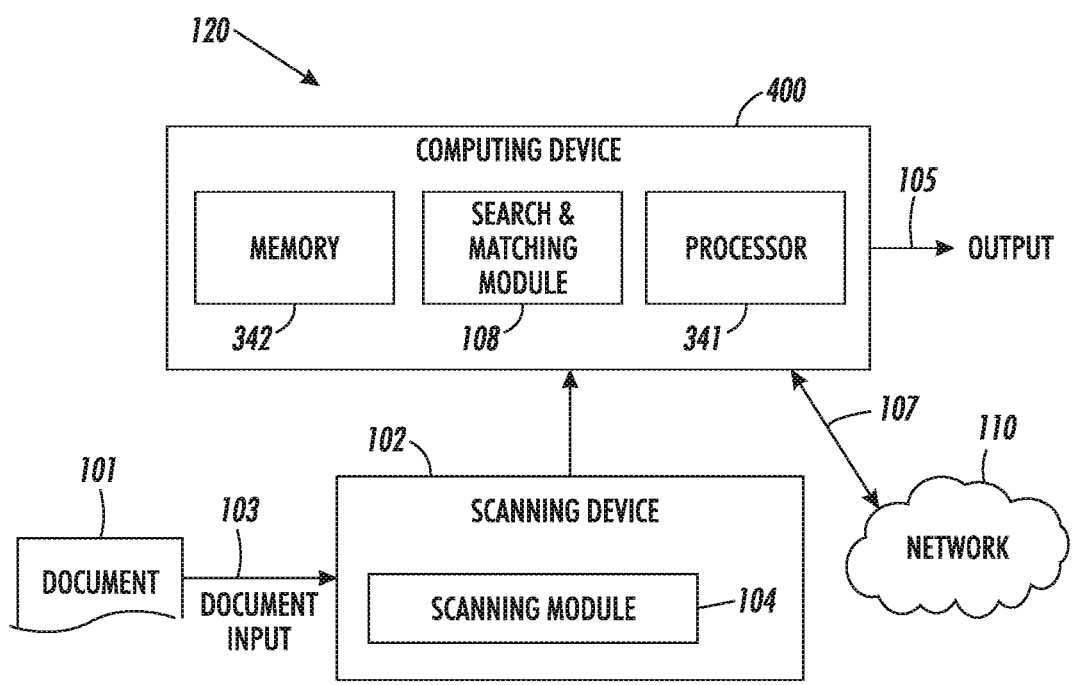
FIG. 2 illustrates another block diagram illustrating another system for scanning and identifying the source or origin of a document, in accordance with an alternative example embodiment.

In the embodiment of FIG. 1 and elsewhere herein, the functionalities related to creating an OCR document can be performed at/by the scanning device 102 itself, while the functionalities can be performed by an external device such as a computing device 400 as shown in FIG. 2. Various examples of computing device include but are not limited to a server, a desktop PC, a notebook, a workstation, a personal digital assistant (PDA), a mainframe computer, a mobile computing device (e.g., a mobile phone, a tablet, etc.), an internet appliance, and so on.

FIG. 2 illustrates another block diagram illustrating a system 102 for scanning and identifying the source or origin of a document, in accordance with an alternative example embodiment. Note that in FIGS. 1-2 and throughout the specification, identical parts or elements are generally indicated by identical reference numerals.

Thus, as shown in FIG. 2, a computing device 400 includes a memory 342, the search and matching module 108 and a processor 341. In the example shown in FIG. 2, the search and matching module 108 may be contained as part of the computing device 400 instead of the scanning module 102. In other embodiments, however, a search and scanning module 108 may be contained both the scanning device 102 and computing device 400. In any event, in the scenario depicted in FIG. 2, the scanning device 102 can scan the input document 101 as discussed previously with respect to FIG. 1 and then the scanned document (i.e., the digital image of the scanned document) can be provided to the computing device 400, which then performs the search and matching operation via the search and matching module 108 as discussed previously. The module 108 in some embodiments can be stored as computer instructions in memory 342 and then processed by the processor 341.

Note that the search and matching module 108 can search an electronic network 110 such as, for example, the Internet, via a search engine to determine if a match exists between the scanned content and Internet search results. Note that the term "search engine" as utilized herein generally refers to a system that executes a search and retrieves stored data. The search engine may form part of the search and matching module (e.g., a sub-module of the module 108) or may be a separate application accessible by the search and matching module. The search performed by the search engine is performed automatically. Such a search engine can be configured to identify search results responsive to a query composed of, for example, the content contained in the scanned document 101 (e.g., after being subject to an OCR operation).

The term "Internet" as utilized herein refers to the global computer network providing a variety of information and communication facilities, consisting of interconnected networks using standardized communication protocols. Electronic communication between the computing device 400 and the electronic network 110 is indicated by arrow 107 in FIG. 2 and may be implemented via wireless and/or wireline communications.

FIG. 2 thus another exemplary system 120 including the scanning device 102 and a computing device 400. The details of the scanning device 102 remain the same as discussed above (i.e., FIG. 1) and thus need not be discussed again. The scanning device 102 may not include a search and matching module or may communicate with the computing device 400 for generating the OCR document containing the content to be utilized as part of the automatic Internet search and matching operation. In the particular embodiment of FIG. 2, the computing device 400 generates the OCR document. The scanning device 102 is in communication with the computing device 400 through a wired or wireless network (although not shown).

Such a network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the Internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the scanning device 102 and other connected devices/systems.

As shown in FIG. 2, the computing device 400 receives the scanned image from the scanning device 102. While in other embodiments, the computing device 400 may receive the scanned/digital image of the input document 101 from other sources. For example, the computing device 400 may download the digital image from a server, or receive the digital image from a user through email, USB transfer, Bluetooth transfer or the like.

Upon receiving, the digital image is stored in a memory 342 of the computing device 400 and is sent to the search and matching module 234 for further processing, i.e., for searching the Internet and comparing search results against the content of the scanned document (i.e., the digital image). The details of the module 108 remains similar to the module 108 as discussed above with respect to FIG. 1 and hence the details can be referred to. In this manner, the OCR document can be generated by the computing device 400 rather than by the scanning module 104.

Assuming that an exact match is found as a result of the aforementioned Internet search (i.e., performed by the system 100 or the alternative system 120), the user can be presented via the aforementioned GUI with several options to select from. A user can select from one or more of the following options. First, the user can be presented with an option to request that the URL associated with the matched content be sent to his or her email for reading rather than printing the document (i.e., the matched document). This is a "greener" option because it eliminates the need to print the whole document. Second, if the user has only part of the document, the user can choose to print the rest of the content from the online source. Third, the user can be presented with an option that allows the user to annotate the scanned document with the URL (e.g., to potentially identify plagiarism wherein the exact content of scanned document has been found on the Internet as a result of the Internet search) and then print the document with the URL(s) embedded in the document.

Figure 3:
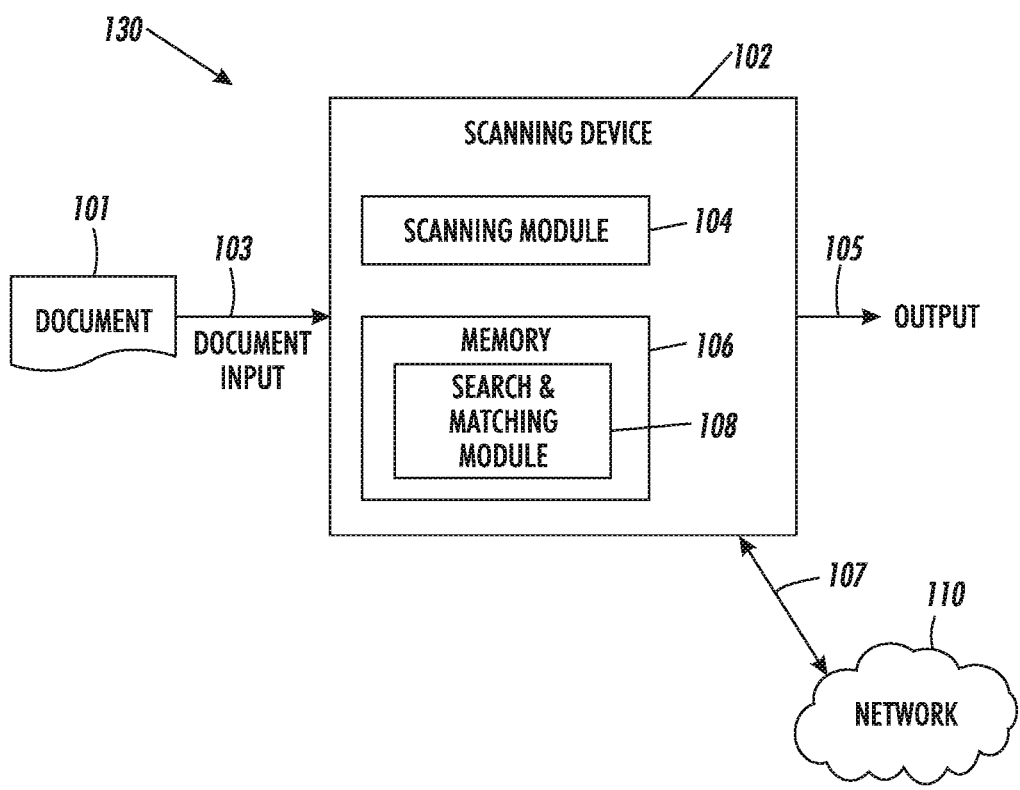
FIG. 3 illustrates a block diagram illustrating another system for scanning and identifying the source or origin of a document, in accordance with an example embodiment.

FIG. 3 illustrates a block diagram illustrating another system 130 for scanning and identifying the source or origin of a document, in accordance with an example embodiment. The system 130 is a slightly different version of the system 100 shown in FIG. 1. In the arrangement shown in FIG. 3, the search and matching module is stored in memory 106 and can be retrieved and processed by a processor (not shown in FIG. 1).

Figure 4:
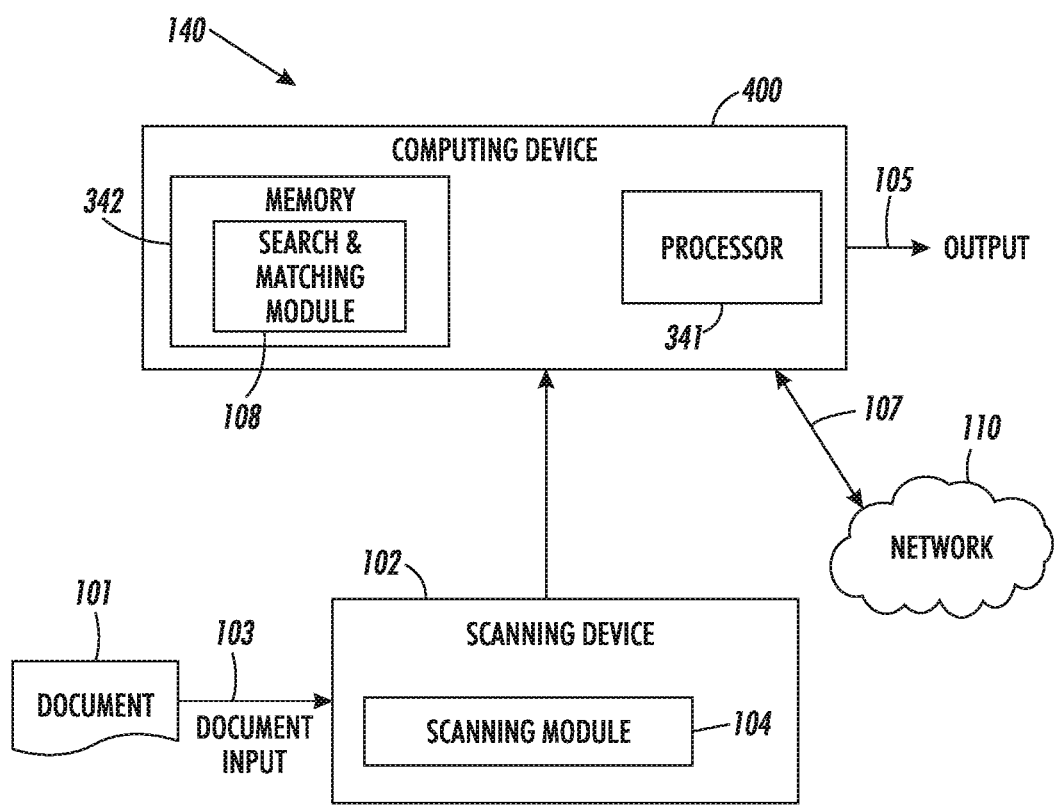
FIG. 4 illustrates an additional block diagram illustrating yet another system for scanning and identifying the source or origin of a document, in accordance with an alternative example embodiment.

FIG. 4 illustrates an additional block diagram illustrating yet another system 140 for scanning and identifying the source or origin of a document, in accordance with an alternative example embodiment. The system 140 is a slightly different version of the system 120 shown in FIG. 2. In the configuration shown in FIG. 4, the module 108 is shown as stored in memory 108 and may be processed via the processor 341 resulting in output indicated by arrow 105.

Figure 5:
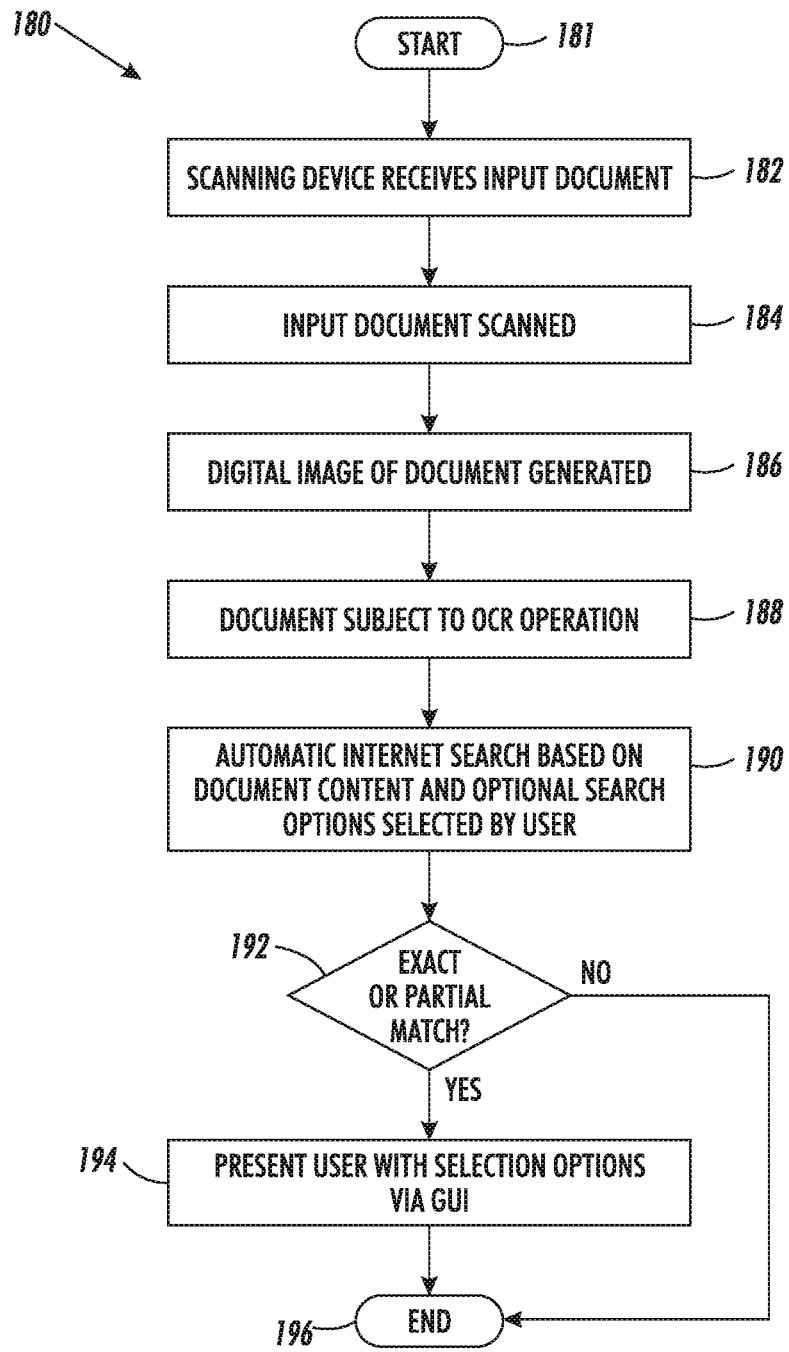
FIG. 5 illustrates a high-level flow of operations depicting logical operation steps of a method for scanning and identifying the source or origin of a document, in accordance with an example embodiment.

FIG. 5 illustrates a high-level flow of operations depicting logical operation steps of a method 180 for scanning and identifying the source or origin of a document, in accordance with an example embodiment. As shown at block 181, the method 180 can be initiated. As shown next at block 182, a step, operation or instruction can be implemented wherein the scanning device 102 can receive a document such as input document 101. Next, as indicated at block 184, a step, operation or instruction can be implemented in which the document 101 is actually scanned via the scanning device 102. The scanning module 104 discussed previously can facilitate this operation.

Thereafter, as depicted at block 186, a step, operation or instruction can be processed in which the digital image of the scanned document is generated. Then, as illustrated at block 188, the digital image can be subject to an OCR operation. The operations shown at blocks 186 and 188 may be facilitated by the scanning module 104 or another module such as, for example, a separate module for generating the digital image and/or a separate module for performing the OCR operation. Such modules may communicate with one another and in some cases may be stored in, for example, the memory 106 and/or memory 342.

In any event, once the OCR operation is complete, an Internet search can be automatically performed as depicted at block 190 to search for the exact content or even partial contained in the OCR document. Such an Internet search can be automatically performed based on the document content and optionally based on search options selected by a user. There are a number of possible search options that can be selected by a user. These options can be presented for the user in the context of an interactive GUI. The user can make his or her selections through a GUI associated with, for example, the various systems and devices previously discussed herein. Examples of such search options are summarized below:

a) The user can request that the search be performed via the Internet or limited to a specified server (e.g., by name or ip address);

b) The user may request that he or she be notified only on a 100 percent match or on a partial match;

c) On a match, the user can specify that he or she only wants the URLS or the content to be downloaded as well;

d) The user can use a scanned document or insert a soft copy of the document or type text on the local interface;

e) The user can select to exclude/include URLs/pictures within the document (as there could have a hyper link inside a hyperlink) for the search; and f) The user can limit the search to a particular geographical region.

A search engine as discussed may facilitate this search. If an exact or a partial search is not found (e.g., no match is found at all) as shown at decision block 192, the process then ends as depicted at block 196. If an exact search is found as indicated at decision block 192, the user can be presented with various selection options via a GUI, as shown at block 194. The process then terminates, as indicated at block 195. Note that the steps, instructions or operations shown at blocks 190, 192 and 194 can be implemented by, for example, the search and matching module 108.

Figure 6:
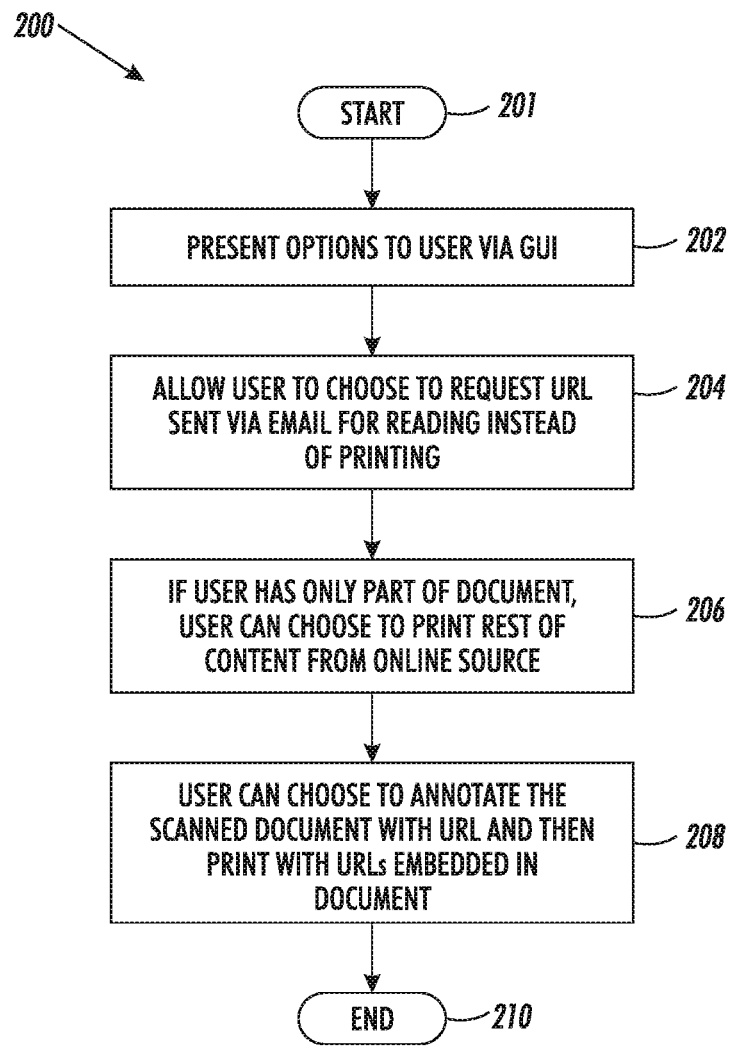
FIG. 6 illustrates a high-level flow of operations depicting logical operation steps of a method for providing a user with additional options if a match is found as a result of an Internet search, in accordance with an example embodiment.

FIG. 6 illustrates a high-level flow of operations depicting logical operation steps of a method 200 for providing a user with additional options if a match is found as a result of an Internet search, in accordance with an example embodiment. These additional options can be provided for the user via a GUI. Assuming that a match was found as a result of the operations shown in, for example, FIG. 5, options can be presented to the user as shown at block 202 via the GUI discussed previously. These options are generally outlined in the various steps, operations or instructions shown in blocks 204, 206, 208. As shown at block 204, a step, operation or instruction can be implemented which presents the user (e.g., via a GUI) with an option to choose to request that the URL be send via an email to his or her email address for reading rather than printing of the document. As discussed previously, this is a "greener" option because it eliminates the need to print the whole document.

As shown at block 206, a step, operation or instruction can be implemented which presents the user with an option to print part of the document from the online source. That is, if the user only has a part of the document, the user can choose to print the rest of the content from the online source (i.e., the online source identified as a result of the previously discussed searching and matching operation). A shown at block 208, a step, operation or instruction can be implemented with presents the user with an option to choose to annotate the scanned content with the URL (e.g., to identify plagiarism) and then print the document with URLs embedded in the document. The process can then end, as shown at block 210.

It should be appreciated that the order of the various steps, operations instructions shown at the various blocks in FIGS. 5-6 can be arranged or implemented in a different order or with fewer or more steps, operations and instructions. In other words, the ordering show in FIGS. 5-6 is not a limiting feature of the disclosed embodiments.

As can be appreciated by one skilled in the art, example embodiments can be implemented in the context of a method, data-processing system, or computer program product. Accordingly, some embodiments may take the form of an entirely hardware embodiment, an entirely software embodiment or an embodiment combining software and hardware aspects all generally referred to herein as a "circuit" or a "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, and so on.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer.

The aforementioned computer program instructions may also be stored in a computer-readable memory (e.g., such as memory 342, memory 106 and so on) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
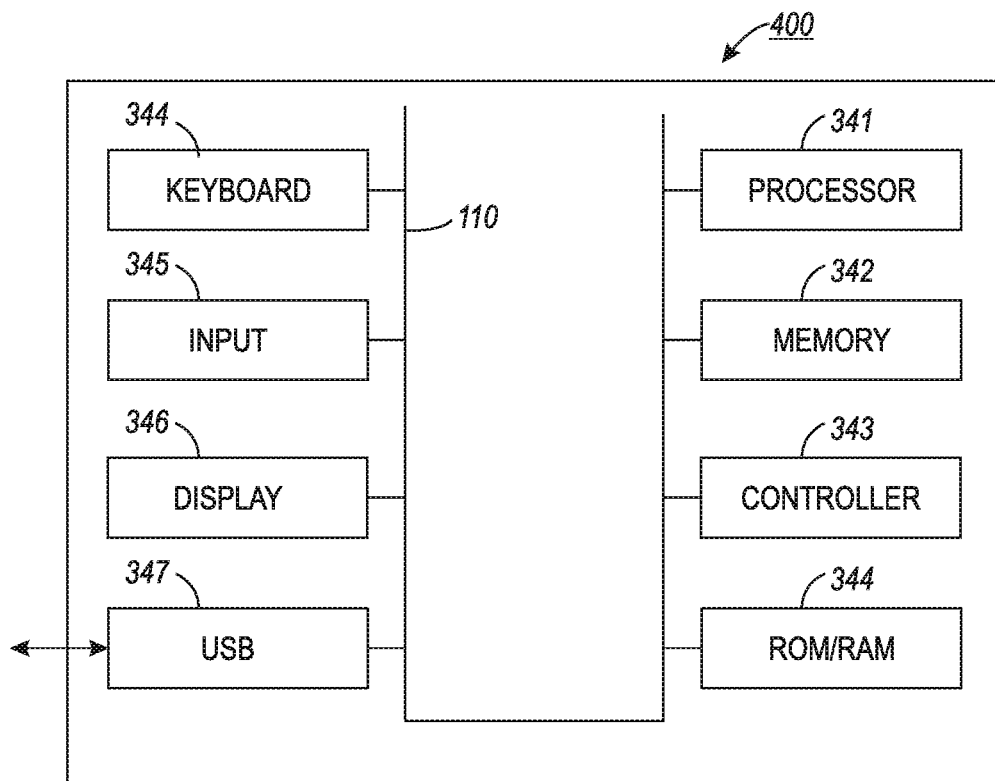
FIG. 7 illustrates a schematic view of a computer system, in accordance with an embodiment.
Figure 8:
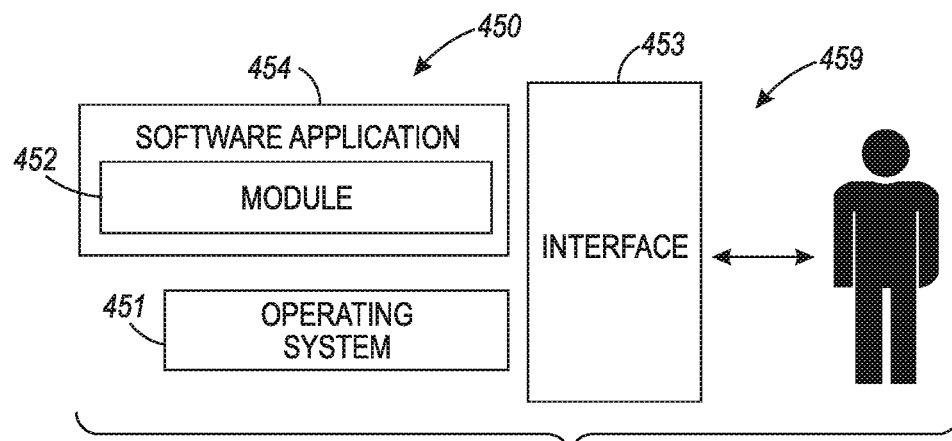
FIG. 8 illustrates a schematic view of a software system including a module, an operating system, and a user interface, in accordance with an embodiment.

FIGS. 7-8 are shown only as exemplary diagrams of data-processing environments in which example embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Such a CPU, alone or in conjunction with one or more of the other elements disclosed in FIG. 4, is an example of a production device, computing device or processor. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server). The network 110 discussed previously can be implemented as, for example, a client-server based network.

In some example embodiments, the data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 8 illustrates a computer software system 450 for directing the operation of the data-processing system 400 depicted in FIG. 7. The software application 454, stored for example in memory 342 and/or another memory, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as discussed herein. Examples of module 453 include but are not limited to modules such as the scanning module 104 and the search and matching module 108 discussed previously.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In some example embodiments, the term "module" can also refer to a modular hardware component or a component that is a combination of hardware and software. Examples of modules include the various modules discussed and described herein. A module or group of modules can implement the various elements, instructions, steps and/or operations described herein.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms and/or operating systems, including, for example, Macintosh/Apple (e.g., Mac OSx, iOS), UNIX, LINUX, Windows, Android, and so on.

Figure 9:
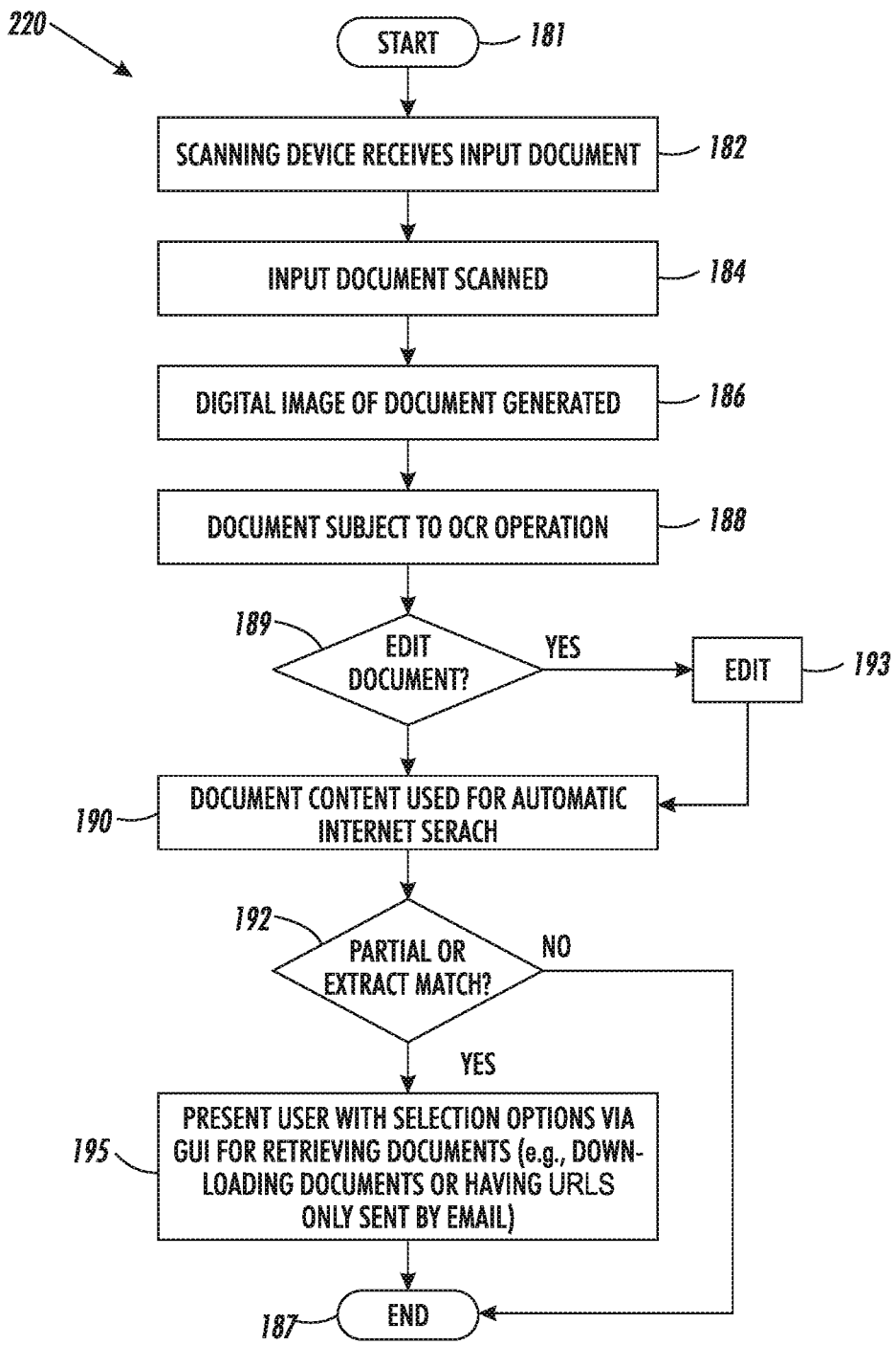
FIG. 9 illustrates a high-level flow of operations depicting logical operation steps of a method for scanning and identifying the source or origin of a document, in accordance with another example embodiment.

FIG. 9 illustrates a high-level flow of operations depicting logical operation steps of a method 220 for scanning and identifying the source or origin of a document, in accordance with another example embodiment. The method 220 shown in FIG. 9 is an alternative version of the method 180 discussed previously with respect to FIG. 5. Thus, in FIGS. 5 and 9, identical or similar operations, steps or instructions are indicated by identical reference numerals. Thus, the operations shown at blocks 181, 182, 184, 186, 188 and so on in FIG. 9 are identical or similar to the same blocks depicted in FIG. 5.

The method 220 shown in FIG. 9 provides some additional steps or operations than those show in FIG. 5. For example, following OCR operation depicted at block 188, the user can be provided with an option to edit the document prior to the actual search operation. This option can be selected through a GUI as discussed previously. Thus, if a user elects to edit the document as shown at decision block 189, then the user is provided with application tools for editing the document and the document can undergo user editing, as depicted at block 193. Thus, a user may edit the document after the document has been subject to OCR.

The user can thus be presented with an option to edit the document to, for example, remove any diagrams, URLs, etc., or to add or remove text and so on. The resulting search as shown at block 190 can be based on the edited document. The user may also choose not to edit the document as indicated at decision block 189 and the search can be performed, as shown at block 190, based on the contents of the unedited document.

Following an exact or partial match, as shown at block 195, the user can be presented with a number of selection options as discussed previously but specifically, the user can request that the resulting content (matched content) be downloaded directly for the user (e.g., downloaded through a Web browser) or the URL or URLs associated with the matched content be sent only by email to the user's email address.

It is understood that the specific order or hierarchy of steps, operations, or instructions in the processes or methods disclosed is an illustration of exemplary approaches. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

Based on the foregoing, it can be appreciated that a number of preferred and alternative embodiments are disclosed herein. In a preferred embodiment, for example, a method for scanning a document to detect the source of the document, can be implemented. Such a method can include steps, operations or instructions such as, for example: scanning a document to obtain content from the document; automatically searching an electronic network to determine if there is an exact match or a partial match between the content of the document and results of search automatic search; and if an exact match or a partial match is generated as a result of the automatically searching the electronic network, presenting a user with at least one option for retrieving, viewing and printing search results of the automatic search.

In some example embodiments, the aforementioned scanning of the document to obtain the content from the document, can further involve a step, operation or instruction of obtaining the content from the document utilizing OCR. In yet another example embodiment, the at least one option for retrieving, viewing and printing search results of the automatic search, can further involve a step, operation, or instruction of allowing a user to request that at least one URL associated with the results of the automatic search be sent by email to an email address associated with the user.

In still another example embodiment, the at least one option for retrieving, viewing and printing search results of the automatic search, can further involve a step, operation, or instruction of: if a user possesses only a portion of a matched document contained in the results of the automatic search, permitting the user to select a remainder of content of the matched document from an online source contained in the results of the automatic search.

In yet another example embodiment, the at least one option for retrieving, viewing and printing search results of the automatic search, can further involve a step, instruction or operation of: if the exact match or the partial match is generated, allowing a user to request that at least one URL associated with the results of the automatic search be sent by email to an email address associated with the user.

In another example embodiment, the at least one option for retrieving, viewing and printing search results of the automatic search, can further include a step, instruction or operation of: if the exact match or the partial match is generated, allowing a user to request that content associated with the results of the automatic search be automatically downloaded for the user.

In yet another example embodiment, the at least one option for retrieving, viewing and printing search results of the automatic search, comprises: allowing a user to annotate the scanned document with at least one URL contained in the search results and to print the scanned document with the at least one URL embedded in the scanned document.

In still another example embodiment, a step, operation or instruction can be implemented for allowing a user to edit the content of the document after the document is scanned and prior to automatically searching the electronic network to determine if there is an exact match or a partial match between the content of the document and the results of search automatic search.

In another example embodiment, a system for scanning a document to detect a source of the document can be implemented, which includes: at least one processor, and a memory storing one or more applications that, when executed on the at least one processor, performs an operation, the operation comprising: scanning a document to obtain content from the document; automatically searching an electronic network to determine if there is an exact match or a partial match between the content of the document and results of search automatic search; and if an exact match or a partial match is generated as a result of the automatically searching the electronic network, presenting a user with at least one option for retrieving, viewing and printing search results of the automatic search.

In yet another example embodiment, a non-transitory computer-readable storage medium contains instructions that, when executed by one or more processors, can be implemented, performs an operation for scanning a document to detect a source of the document, the operation comprising: scanning a document to obtain content from the document; automatically searching an electronic network to determine if there is an exact match or a partial match between the content of the document and results of search automatic search; and if an exact match or a partial match is generated as a result of the automatically searching the electronic network, presenting a user with at least one option for retrieving, viewing and printing search results of the automatic search.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for scanning a document to detect a source of said document, said method comprising:
   scanning a document with a scanning device;
   capturing content from said document, wherein the document prior to the scanning comprises an input document comprising a hard copy of a physical document provided to the scanning device, wherein after the scanning of the document, the document comprises a digital document comprising an electronic document subject to an image processing operation;
   displaying the digital document in a graphical user interface for a user upon completion of the scanning of the document or during the scanning of the document with the scanning device;
   automatically searching an electronic network with a search engine to determine if there is an exact match or a partial match between said content of said document and search results of the automatic search, wherein the search engine is operable to identify search results responsive to a query composed of the content contained in the document scanned by the scanning device after the electronic document has been subject to the image processing operation;
   when an exact match or a partial match is generated as a result of said automatically searching said electronic network with said search engine, presenting a user with at least one option among a plurality of options through the graphical user interface for retrieving, viewing and printing the search results of said automatic search, the at least one option including allowing a user to annotate said scanned document through the graphical user interface with at least one URL contained in said search results and to print said scanned document with said at least one URL embedded in said scanned document.

2. The method of claim 1 wherein the scanning of the document with the scanning device and the capturing of the content from the document, further comprise:
   receiving a digital input of the input document;
   producing a digital image based on the digital input of the input document;
   converting the digital document into a binary form;
   removing all lines from the digital image;
   performing an OCR (Optical Character Recognition) operation of text and other images contained in the digital image of the scanned document, the OCR operation further comprising rendering the digital image as the electronic document in a pre-defined format that is editable and searchable.

3. The method of claim 1 wherein said at least one option for retrieving, viewing and printing search results of said automatic search, comprises:

allowing a user to request that the at least one URL associated with said results of said automatic search be sent by email to an email address associated with said user.

4. The method of claim 1 wherein said at least one option presented through the graphical user interface for retrieving, viewing and printing search results of said automatic search, comprises:

when a user possesses only a portion of a matched document contained in said results of said automatic search, permitting said user to select a remainder of content of said matched document from an online source contained in said results of said automatic search.

5. The method of claim 1 wherein said at least one option presented through the graphical user interface for retrieving, viewing and printing search results of said automatic search, comprises:

When said exact match or said partial match is generated, allowing a user to request that at least one URL associated with said results of said automatic search be sent by email to an email address associated with said user.

6. The method of claim 1 wherein said at least one option presented through the graphical user interface for retrieving, viewing and printing search results of said automatic search, comprises:

when said exact match or said partial match is generated, allowing a user to request that content associated with said results of said automatic search be automatically downloaded for said user.

7. The method of claim 1 further comprising allowing a user to edit said content of said document through said graphical user interface after said document is scanned and prior to automatically searching said electronic network to determine if there is an exact match or a partial match between said content of said document and said results of search automatic search displayed in the graphical user interface.

8. A system for scanning a document to detect a source of said document, said system comprising:

at least one processor; and a memory storing one or more applications that, when executed on said at least one processor, performs an operation, said operation comprising:

scanning a document with a scanning device to obtain content from said document;

capturing the content from said document, wherein the document prior to the scanning comprises an input document comprising a hard copy of a physical document provided to the scanning device, wherein after the scanning of the document, the document comprises a digital document comprising an electronic document subject to an image processing operation;

displaying the digital document in a graphical user interface for a user upon completion of the scanning of the document or during the scanning of the document with the scanning device;

automatically searching an electronic network with a search engine to determine if there is an exact match or a partial match between said content of said document and search results of the automatic search, wherein the search engine is operable to identify search results responsive to a query composed of the content contained in the document scanned by the scanning device after the electronic document has been subject to the image processing operation; and when an exact match or a partial match is generated as a result of said automatically searching said electronic network with said search engine, presenting a user with at least one option among a plurality of options through the graphical user interface for retrieving, viewing and printing the search results of said automatic search, the at least one option including allowing a user to annotate said scanned document through the graphical user interface with at least one URL contained in said search results and to print said scanned document with said at least one URL embedded in said scanned document.

9. The system of claim 8 wherein the operation for scanning of the document with the scanning device and the operation for capturing of the content from the document, further comprise:

receiving a digital input of the input document;

producing a digital image based on the digital input of the input document;

converting the digital document into a binary form;

removing all lines from the digital image;

performing an OCR (Optical Character Recognition) operation of text and other images contained in the digital image of the scanned document, the OCR operation further comprising rendering the digital image as the electronic document in a pre-defined format that is editable and searchable.

10. The system of claim 8 wherein said at least one option presented through the graphical user interface for retrieving, viewing and printing search results of said automatic search, comprises:

allowing a user to request that at least one URL associated with said results of said automatic search be sent by email to an email address associated with said user.

11. The system of claim 8 wherein said at least one option presented through the graphical user interface for retrieving, viewing and printing search results of said automatic search, comprises:

when a user possesses only a portion of a matched document contained in said results of said automatic search, permitting said user to select a remainder of content of said matched document from an online source contained in said results of said automatic search.

12. The system of claim 8 wherein said at least one option presented through the graphical user interface for retrieving, viewing and printing search results of said automatic search, comprises:

when said exact match or said partial match is generated, allowing a user to request that the at least one URL associated with said results of said automatic search be sent by email to an email address associated with said user.

13. The system of claim 8 wherein said at least one option presented through the graphical user interface for retrieving, viewing and printing search results of said automatic search, comprises:

when said exact match or said partial match is generated, allowing a user to request that content associated with said results of said automatic search be automatically downloaded for said user.

14. The system of claim 8 wherein said operation further comprises allowing a user to edit said content of said document after said document is scanned and prior to automatically searching said electronic network to determine if there is an exact match or a partial match between said content of said document and said results of search automatic search.

15. A non-transitory computer-readable storage medium containing instructions that, when executed by one or more processors, performs an operation for scanning a document to detect a source of said document, said operation comprising:

scanning a document with a scanning device to obtain content from said document;

capturing the content from said document, wherein the document prior to the scanning comprises an input document comprising a hard copy of a physical document provided to the scanning device, wherein after the scanning of the document, the document comprises a digital document comprising an electronic document subject to an image processing operation;

displaying the digital document in a graphical user interface for a user upon completion of the scanning of the document or during the scanning of the document with the scanning device;

automatically searching an electronic network with a search engine to determine if there is an exact match or a partial match between said content of said document and search results of the automatic search, wherein the search engine is operable to identify search results responsive to a query composed of the content contained in the document scanned by the scanning device after the electronic document has been subject to the image processing operation; and when an exact match or a partial match is generated as a result of said automatically searching said electronic network with said search engine, presenting a user with at least one option through the graphical user interface for retrieving, viewing and printing the search results of said automatic search, the at least one option including allowing a user to annotate said scanned document through the graphical user interface with at least one URL contained in said search results and to print said scanned document with said at least one URL embedded in said scanned document.

16. The non-transitory computer-readable storage medium of claim 15 wherein said operation for scanning said document to obtain said content from said document and said operation for capturing the content of the document, further comprise:

receiving a digital input of the input document;

producing a digital image based on the digital input of the input document;

converting the digital document into a binary form;

removing all lines from the digital image;

performing an OCR (Optical Character Recognition) operation of text and other images contained in the digital image of the scanned document, the OCR operation further comprising rendering the digital image as the electronic document in a pre-defined format that is editable and searchable.

17. The non-transitory computer-readable storage medium of claim 15 wherein said at least one option presented through the graphical user interface for retrieving, viewing and printing search results of said automatic search, comprises:

allowing a user to request that at least one URL associated with said results of said automatic search be sent by email to an email address associated with said user.

18. The non-transitory computer-readable storage medium of claim 15 wherein said at least one option presented through the graphical user interface for retrieving, viewing and printing search results of said automatic search, comprises:

when a user possesses only a portion of a matched document contained in said results of said automatic search, permitting said user to select a remainder of content of said matched document from an online source contained in said results of said automatic search.

* * * * *